Aug. 11, 1964  T. E. O'CONNOR  3,144,305
LUBRICIOUS CRYSTALLINE BORON NITRIDE
AND PROCESS FOR PRODUCING SAME
Filed Feb. 2, 1960
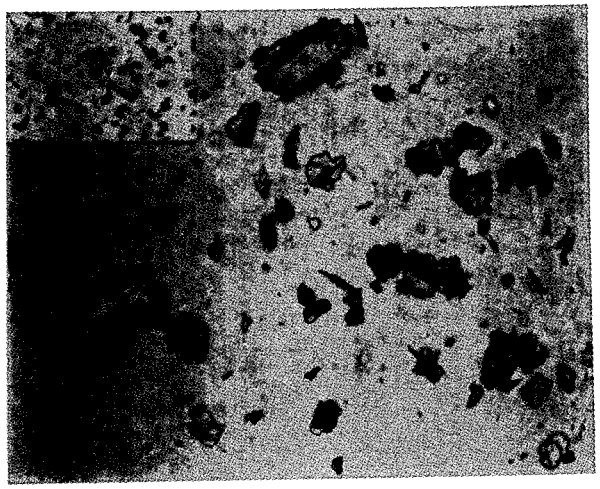
INVENTOR
TIMOTHY EDMOND O'CONNOR
ATTORNEY 3,144,305
LUBRICIOUS CRYSTALLINE BORON NITRIDE
AND PROCESS FOR PRODUCING SAME
Timothy Edmond O'Connor, Brandywine Hundred, Del.,
assignor to E. I. du Pont de Nemours and Company,
Wilmington, Del., a corporation of Delaware
Filed Feb. 2, 1960, Ser. No. 6,173
4 Claims. (Cl. 23—191)

This invention relates to boron nitride and is particularly directed to a lubricious boron nitride prepared by heating boron nitride in an inorganic liquid to a temperature above 1000° C. in contact with a preformed crystalline boron nitride seed.

In the drawing, FIGURE 1 is a photomicrograph at a magnification of 500 diameters of the platelets of lubricious boron nitride produced according to this invention. The insert in the upper left corner is a photomicrograph at the same magnification of the platelets of boron nitride produced according to previously known processes.

Boron nitrides prepared by previously known processes are composed of small crystalline platelets. Since the lubricity of a boron nitride is proportional to the dimensions of its platelets, these boron nitrides have proved to be poor lubricants.

A boron nitride having much larger platelets than any previously known boron nitride can be prepared according to this invention. This novel boron nitride is vastly superior as a lubricant to boron nitrides previously known.

Referring to the drawing, it can be seen that the platelets of the boron nitride of this invention, illustrated by FIGURE 1, are significantly larger than the platelets of a commerically available boron nitride, illustrated by the insert in the upper left corner of FIGURE 1.

The platelets of the commercially available boron nitride have maximum dimensions of no more than 1 or 2 microns. In comparison, the platelets of the boron nitride of this invention have average maximum dimensions of about 20 microns, and some platelets have average maximum dimensions as large as 40 microns. By "average" is meant arithmetic average.

Because of the superiority of the boron nitride of this invention as a lubricant, it will be referred to as "lubricious" boron nitride.

Lubricious boron nitride can be prepared by heating an ordinary commercially available boron nitride to a temperature above 1000° C. in an inert inorganic liquid and in contact with a preformed lubricious boron nitride seed.

A preferred boron nitride starting material is that produced by the process of my copending application Serial No. 4,252 titled "Process and Products," filed January 25, 1960. According to this process, 1 mole of boric acid and 1 to 2 moles of a nitrogeneous material chosen from the group containing urea, biuret, triuret, cyanuric acid, ammelide, melamine, thiourea, guanidine, aminoguanidine, cyanamide, dicyandiamide, semicarbazide, and thiosemicarbazide are mixed and heated to a temperature of about 350° C., while water and other volatiles are removed from the reaction zone. During this heating, the mixture melts and is transformed into a white intermediate solid. Heating is then continued in an atmosphere of ammonia until a final temperature of about 950° C. is reached, whereupon boron nitride is formed from the solid intermediate. The resultant product is cooled in nitrogen and is then ready for use in the process of this invention.

The inorganic liquid used in the process of this invention can be any substance which is inert to the reactants, is liquid at the temperatures of the process, and is easily removed from the final product by volatilization or by washing with water or other suitable solvents. Such substances as aluminum borate, cryolite, calcium silicate, boric oxide, the halides of the alkali and alkaline earth metals, or mixtures of these can be used successfully.

The preferred substance is a boric oxide. It can be added during the process in two ways. First, it can be added to the initial reaction mixture as a boric oxide powder, or second, it can be present as an impurity in the boron nitride starting material. Such a boron nitride starting material is produced by the method described above, modified by maintaining the ammoniation temperature below 900° C. A boron nitride thus produced will contain from 5% to 20% of a boric oxide.

The inorganic substance should be added at a concentration of 1% to 90% by weight of the total weight of the reactants. The precise amount depends on the substance used; generally, however, it can be said that a concentration of from 5% to 25% by weight is suitable. It should be present in at least an amount sufficient to wet the reactants.

The function of the inorganic substance in this invention is not completely understood. It is believed, however, that it increases the heat transfer in the process and also aids it by partially dissolving the reactants.

The lubricious boron nitride seed is obtained by initially operating the process of this invention with a seed of ordinary boron nitride composed of the largest crystals obtainable by methods known heretofore. The product of this initial operation is more lubricious than the seed used, and a portion is reserved and is used as seed in the next operation. This method is followed in succeeding operations, the seed becoming progressively better until after about 5 cycles, a seed of excellent characteristics is obtained.

The seed should be present at a concentration of 2% to 5% by weight of the boron nitride starting material.

The process of this invention can also be carried out without using a preformed seed, but the product, while superior to any previously known boron nitride with respect to platelet size, is not equal to the product obtained when a preformed seed is used.

In practicing this invention, the proper amounts of boron nitride seed and inorganic material are pulverized until the particles pass through a standard 60-mesh screen. The components are then throughly mixed in a suitable blender, such as a conical- or ribbon-type blender. The mixture is tightly packed by tamping it into a container constructed of a temperature-resistant material, preferably graphite. The container is then sealed. The exact degree of packing varies with the nature of the inorganic material used and with the scale of the operation, the requirement of packing being less critical with large-scale operations and when less volatile inorganic materials are used. The container preferably has a lining of lubricious boron nitride deposited on its walls from previous operations. This lining prevents the contamination of the final product with the material from which the container is constructed. The tight packing is necessary to restrict the escape of boric oxide and other volatiles, and to insure the complete conversion of the boron nitride to the lubricious form. The layer of lubricious boron nitride on the container walls also aids in preventing this escape of volatiles.

The container and its contents are then heated to above 1000° C. in an atmosphere of nitrogen. The final temperature is dependent on the inorganic substance used and must be sufficiently great to melt the inorganic material, but should not be so high as to cause its rapid volatilization. The temperature selected should be between the melting point and the boiling point of the inorganic material and should in all cases be above 1000° C., since below this temperature the presence of the inorganic material as a liquid together with the seed has only a minimum effect in converting the boron nitride starting material to libricious boron nitride.

When boric oxide is used as the inorganic material, the temperature of the reaction should be maintained at above 1300° C. for optimum results.

The heating should continue for from 5 to 15 hours, preferably about 10 hours. At the end of the heating period the inorganic material is removed by raising the temperature above its boiling point and holding this elevated temperature until the inorganic material is completely volatilized and removed. The container and its contents are then cooled in nitrogen and the lubricious boron nitride is removed.

Lubricious boron nitride can be used as a lubricant and is especially suited for use as a lubricant in apparatus used at extremes of temperature, such as pumps for liquid oxygen. As a lubricant, it can be used as a powder or as a suspension in a suitable carrier. It can be mixed with other lubricants such as graphite or hydrocarbon oils in any proportion.

Lubricious boron nitride can also be used as a mold release agent in the glass industry. Glass objects are easily removed from molds which are thinly coated with lubricious boron nitride powder.

The boron nitride of this invention is an excellent pearlescent pigment and can be added to paints, lacquers, and the like to impart luster to these products. When so used, it can replace part or all the usual pigments, depending on the degree of luster desired.

This invention will be better understood by referring to the following illustrative examples:

*Example 1*

A boron nitride starting material was prepared according to the boric acid-urea process described above. This process was modified by maintaining the ammoniation temperature below 900° C. The boron nitride thus produced had a nitrogen content of 51.4% and a residual oxygen content of 6.1%.

Fifty grams of the starting material were pulverized and mixed with 2 grams of lubricious boron nitride seed. The seed was a highly lubricious material obtained from a previous operation and consisted of translucent plates having an average maximum dimension of about 10 to 15 microns. The mixture of boron nitride starting material and seed was then ground with a mortar and pestle. As the grinding proceeded, the initially gritty mixture became slightly lubricious as the starting material became coated with the lubricious seed.

A 44.5-gram portion of this mixture was then placed in a cylindrical capsule machined from high-quality electrographite. The wall of the capsule had a layer of highly lubricious boron nitride deposited on it from previous operations. This layer adhered tenaciously to the wall of the capsule. The ends of this capsule were threaded to screw into the cylinder in order to obtain a tight closure.

The finely pulverized mixture of boron nitride and seed was packed into the capsule until the bulk density of the charge was about 0.68 gram per cubic centimeter. The capsule and its contents were then heated in a stream of dry nitrogen in a carbon resistance furnace according to the following schedule.

| Temperature: | | Time |
|---|---|---|
| RT→700° C. | minutes | 15 |
| 700° C. | hours | 1 |
| 800° C. | do | 1 |
| 1800° C. | do | 10 |

Heating was then discontinued and the capsule was cooled in a stream of nitrogen. The resulting boron nitride product in the capsule was in the form of a cylindrical mass which had detached itself from the capsule wall. This mass slid readily from the capsule and was easily pulverized with a mortar and pestle.

Microscopic examination of this boron nitride showed it to be composed of thin platey crystals whose average maximum dimension was 20 microns. Some platelets had diameters in excess of 40 microns.

*Example 2*

A lubricious boron nitride was prepared exactly as outlined in Example 1 except that the boron nitride starting material contained no residual oxygen and the inert inorganic substance used was sodium chloride. Ten grams of sodium chloride were added to the mixture of the boron nitride starting material and the lubricious seed. This mixture was packed into a cylindrical graphite capsule as in Example 1 and was similarly heated. The product obtained was a highly lubricious boron nitride having approximately the same physical characteristics as that obtained in Example 1.

*Example 3*

A lubricious boron nitride was prepared exactly as outlined in Example 1 except that the boron nitride starting material contained no residual oxygen and the inert inorganic substance used was potassium chloride. Ten grams of potassium chloride were added to the mixture of the boron nitride starting material and the lubricious seed. This mixture was then packed into a cylindrical capsule as in Example 1 and was similarly heated. The product obtained was a highly lubricious boron nitride having the same physical characteristics as that obtained in Example 1.

*Example 4*

A lubricious boron nitride was prepared exactly as in Example 1 except that the boron nitride starting material contained no residual oxygen and the inert inorganic substance used was boric oxide. Ten grams of boric oxide were added to the mixture of boron nitride starting material and lubricious seed. This mixture was then packed into a cylindrical graphite capsule as in Example 1 and was similarly heated. The product obtained was highly lubricious boron nitride having the same physical characteristics as that obtained in Example 1.

The invention claimed is:

1. A lubricious crystalline boron nitride comprising platelets having an average maximum dimension ranging from about 20 to 40 microns which is that produced by the steps of; heating in a sealed container and in an atmosphere of nitrogen, a boron nitride starting material and a liquid selected from the group consisting of inorganic oxides and salts which are inert to the boron nitride starting material, to a temperature above 1000° C., thereafter raising the temperature sufficiently to volatilize said inorganic liquid, removing said volatilized inorganic liquid, cooling said container and its contents and removing the boron nitride material so obtained, the above steps being carried out with the boron nitride starting material and the inorganic liquid in contact with a preformed boron nitride seed, said seed being present in an amount ranging from 2% to 5% by weight of the boron nitride starting material and having been formed by recycling a boron nitride starting material through the above process at least 5 times in the absence of a preformed seed.

2. The process for producing lubricious crystalline boron nitride platelets having an average maximum dimension ranging from about 20 to 40 microns, said process comprising the steps of; heating in a sealed container and in an atmosphere of nitrogen, a boron nitride starting material and a liquid selected from the group consisting of inorganic oxides and salts which are inert to the boron nitride starting material, to a temperature above 1000° C., thereafter raising the temperature sufficiently to volatilize said inorganic liquid, removing said volatilized inorganic liquid, cooling said container and its contents and removing the boron nitride material so obtained, the above steps being carried out with the boron nitride starting material and the inorganic liquid in contact with a preformed boron nitride seed, said seed being present in an amount ranging from 2% to 5% by weight of the boron nitride starting material and having been formed by recycling a boron nitride starting material through the above process at least 5 times in the absence of a preformed seed.

3. The process for producing lubricious crystalline boron nitride platelets having an average maximum dimension ranging from about 20 to 40 microns, said process comprising the steps of; heating in a sealed container and in an atmosphere of nitrogen, a boron nitride starting material and liquid boric oxide, to a temperature above 1000° C., thereafter raising the temperature sufficiently to volatilize said boric oxide, removing said volatilized boric oxide, cooling said container and its contents and removing the boron nitride material so obtained, the above steps being carried out with the boron nitride starting material and the boric oxide in contact with a preformed boron nitride seed, said seed being present in an amount ranging from 2% to 5% by weight of the boron nitride starting material and said seed having been formed by recycling a boron nitride starting material through the above process at least 5 times in the absence of a preformed seed.

4. The proces for producing lubricious crystalline boron nitride platelets having an average maximum dimension ranging from about 20 to 40 microns, said process comprising the steps of; heating in a sealed container and in an atmosphere of nitrogen, a boron nitride starting material containing 5% to 20% of a boric oxide, to a temperature above 1000° C. whereby said boric oxide is a liquid, thereafter raising the temperature sufficiently to volatilize said boric oxide, removing said volatilized boric oxide, cooling said container and its contents and removing the boron nitride material so obtained, the above steps being carried out with the boron nitride starting material containing said boric oxide in contact with a preformed boron nitride seed, said seed being present in an amount ranging from 2% to 5% by weight of the boron nitride starting material and said seed having been formed by recycling a boron nitride starting material through the above process at least 5 times in the absence of a preformed seed.

References Cited in the file of this patent

UNITED STATES PATENTS

| | | |
|---|---|---|
| 1,157,271 | Weintraub | Oct. 19, 1915 |
| 2,812,240 | Globus | Nov. 5, 1957 |
| 2,888,325 | Taylor | May 26, 1959 |
| 2,947,617 | Wentorf | Aug. 2, 1960 |
| 2,960,466 | Saunders | Nov. 15, 1960 |
| 2,974,013 | Litz | Mar. 7, 1961 |

FOREIGN PATENTS

| | | |
|---|---|---|
| 282,701 | Germany | Mar. 16, 1915 |
| 483,201 | Great Britain | Apr. 13, 1938 |